(12) United States Patent
   Zhou (10) Patent No.: US 10,423,899 B2
(45) Date of Patent: Sep. 24, 2019

(54) SYSTEMS AND METHODS FOR DETERMINING A REFERENCE DIRECTION RELATED TO A VEHICLE

(71) Applicant: BEIJING DIDI INFINITY TECHNOLOGY AND DEVELOPMENT CO., LTD., Beijing (CN)

(72) Inventor: Xiaofen Zhou, Beijing (CN)

(73) Assignee: Beijing Didi Infinity Technology and Development Co., Ltd., Beijing (CN)

(*) Notice: Subject to any disclaimer, the term of this patent is extended or adjusted under 35 U.S.C. 154(b) by 6 days.

(21) Appl. No.: 15/566,723

(22) PCT Filed: Apr. 14, 2017

(86) PCT No.: PCT/CN2017/080558
§ 371 (c)(1),
(2) Date: Oct. 16, 2017

(87) PCT Pub. No.: WO2018/086308
PCT Pub. Date: May 17, 2018

(65) Prior Publication Data
US 2019/0050764 A1    Feb. 14, 2019

(30) Foreign Application Priority Data
Nov. 8, 2016 (CN) .......................... 2016 1 0983574

(51) Int. Cl.
*G06Q 10/04* (2012.01)
*G01C 21/20* (2006.01)
(Continued)

(52) U.S. Cl.
CPC ....... *G06Q 10/047* (2013.01); *B62D 15/0285* (2013.01); *G01C 21/20* (2013.01);
(Continued)

(58) Field of Classification Search
CPC ................. G06Q 10/047; G06Q 10/02; G08G 1/096816; G08G 1/096838; G08G 1/202;
(Continued)

(56) References Cited

U.S. PATENT DOCUMENTS 6,029,069 A    2/2000  Takaki
6,853,911 B1   2/2005  Sakarya
(Continued)

FOREIGN PATENT DOCUMENTS

CN    1314582 A    9/2001
CN    1449488 A   10/2003
(Continued)

OTHER PUBLICATIONS

International Search Report in PCT/CN2017/080558 dated Jul. 27, 2017, 5 pages.
(Continued)

*Primary Examiner* — Michael J Zanelli
(74) *Attorney, Agent, or Firm* — METIS IP LLC (57) ABSTRACT

The present disclosure relates to systems and methods for processing at least one service request for an on-demand service. The systems may perform the methods to determine a start location and a destination related to the service request; determine a recommended route based on the start location and the destination; determine a reference direction related to a vehicle based on the recommended route; and send, to at least one provider terminal, data related to the reference direction.

18 Claims, 5 Drawing Sheets

(51) Int. Cl.
  *G06Q 50/30* (2012.01)
  *G08G 1/0968* (2006.01)
  *G08G 1/00* (2006.01)
  *B62D 15/02* (2006.01)
  *G06Q 10/02* (2012.01)
  *G06Q 10/08* (2012.01)
  *H04W 4/024* (2018.01)
  *H04W 4/40* (2018.01)

(52) U.S. Cl.
  CPC .......... *G06Q 10/02* (2013.01); *G06Q 10/083* (2013.01); *G06Q 50/30* (2013.01); *G08G 1/096816* (2013.01); *G08G 1/096838* (2013.01); *G08G 1/202* (2013.01); *H04W 4/024* (2018.02); *H04W 4/40* (2018.02)

(58) Field of Classification Search
  CPC .... H04W 4/40; H04W 4/024; G62D 15/0285; G01C 21/20
  See application file for complete search history.

(56) References Cited

U.S. PATENT DOCUMENTS

| | | | |
|---|---|---|---|
| 7,260,473 B2 | 8/2007 | Abe et al. | |
| 7,860,645 B2 | 12/2010 | Kim et al. | |
| 9,239,242 B2 * | 1/2016 | Okude | G01C 21/3492 |
| 9,360,335 B1 | 6/2016 | Powelson et al. | |
| 9,754,338 B2 * | 9/2017 | Haparnas | H04W 4/023 |
| 9,791,291 B1 * | 10/2017 | Yamashita | G01C 21/367 |
| 2004/0158483 A1 | 8/2004 | Lecouturier | |
| 2009/0105934 A1 | 4/2009 | Tajima et al. | |
| 2009/0204320 A1 | 8/2009 | Shaffer et al. | |
| 2011/0099040 A1 * | 4/2011 | Felt | G06F 17/3087 |
| | | | 705/7.12 |
| 2012/0078504 A1 | 3/2012 | Zhou | |
| 2013/0253996 A1 | 9/2013 | Single | |
| 2015/0051822 A1 | 2/2015 | Joglekar | |
| 2016/0069695 A1 | 3/2016 | Broadbent et al. | |
| 2016/0202074 A1 | 7/2016 | Woodard et al. | |

FOREIGN PATENT DOCUMENTS

| | | |
|---|---|---|
| CN | 105448118 A | 3/2016 |
| CN | 106022540 A | 10/2016 |
| EP | 2624235 A2 | 8/2013 |
| EP | 3067662 A1 | 9/2016 |
| JP | 2005077243 A | 3/2005 |
| JP | 2005275678 A | 10/2005 |
| JP | 2006308390 A | 11/2006 |
| JP | 2013076643 A | 4/2013 |

OTHER PUBLICATIONS

Written Opinion of the International Searching Authority in PCT/CN2017/080558 dated Jul. 27, 2017, 4 pages.
Examination Report in Australia Application No. 2017265135 dated Jun. 26, 2016, 5 pages.
First Office Action in Chinese Application No. 201610983574.4 dated Jan. 31, 2019, 11 pages.
Notice of Rejection in Japanese Application No. 2017-555267 dated Jul. 9, 2019, 7 pages.
The Extended European Search Report in European Application No. 17780977.9 dated Jul. 26, 2019, 8 pages.

* cited by examiner

SYSTEMS AND METHODS FOR DETERMINING A REFERENCE DIRECTION RELATED TO A VEHICLE

CROSS-REFERENCE TO RELATED APPLICATIONS

This application is a U.S. national stage under 35 U.S.C. § 371 of International Application No. PCT/CN2017/080558, filed on Apr. 14, 2017, designating the United States of America, which claims priority to Chinese Application No. 201610983574.4, filed on Nov. 8, 2016, the contents of which are incorporated herein by reference by their entireties.

TECHNICAL FIELD

The present disclosure generally relates to systems and methods for on-demand services, and in particular, to systems and methods for determining reference information associated with service requests for an on-demand service.

BACKGROUND

On-demand transportation services utilizing Internet technology, such as online taxi services, have become increasingly popular because of their convenience. A requestor may request a car service at a particular pick-up location via such an on-demand transportation system. When a service provider accepts the request, the service provider may find it difficult to determine a suitable location to park a vehicle to pick up the requestor based on the pick-up location alone.

SUMMARY

According to an aspect of the present disclosure, a system is provided. The system may include at least one storage medium and at least one processor configured to communicate with the at least one storage medium. The at least one storage medium may include a set of instructions for processing at least one service request for an on-demand service. When the at least one processor executes the set of instructions, the at least one processor may be directed to perform one or more of the following operations. The at least one processor may determine a start location and a destination related to the service request. The at least one processor may determine a recommended route based on the start location and the destination. The at least one processor may determine a reference direction related to a vehicle based on the recommended route. The at least one processor may send data related to the reference direction to at least one provider terminal.

In some embodiments, the at least one processor may determine a start direction of the recommended route. The at least one processor may determine the reference direction of the vehicle based on the start direction of the recommended route.

In some embodiments, the at least one processor may determine a plurality of candidate routes. The at least one processor may determine the recommended route based on the plurality of candidate routes.

In some embodiments, the at least one processor may determine a plurality of distances corresponding to the plurality of candidate routes. The at least one processor may rank the plurality of candidate routes based at least in part on the distances to determine a first ranking result. The at least one processor may determine the recommended route based on the first ranking result.

In some embodiments, the at least one processor may identify a first distance of the plurality of distances based on the first ranking result. The at least one processor may select, from the plurality of candidate routes, a first candidate route associated with the first distance as the recommended route.

In some embodiments, the at least one processor may determine a plurality of traffic conditions corresponding to the plurality of candidate routes. The at least one processor may rank the plurality of candidate routes based at least in part on the traffic conditions to determine a second ranking result. The at least one processor may determine the recommended route based on the second ranking result.

In some embodiments, the at least one processor may identify a first traffic condition of the plurality of traffic conditions based on the second ranking result. The at least one processor may select, from the plurality of candidate routes, a second candidate route associated with the first traffic condition as the recommended route.

In some embodiments, the at least one processor may receive the service request from a requestor terminal. The at least one processor may send the data related to the reference direction to the requestor terminal.

In some embodiments, the data related to the reference direction may include data for presentation of the reference direction related to the vehicle.

According to another aspect of the present disclosure, a method is provided. The method may include one or more of the following operations. A processor may determine a start location and a destination related to the service request. The processor may determine a recommended route based on the start location and the destination. The processor may determine a reference direction related to a vehicle based on the recommended route. The processor may send data related to the reference direction to at least one provider terminal.

In some embodiments, the processor may determine a start direction of the recommended route. The processor may determine the reference direction of the vehicle based on the start direction of the recommended route.

In some embodiments, the processor may determine a plurality of candidate routes. The processor may determine the recommended route based on the plurality of candidate routes.

In some embodiments, the processor may determine a plurality of distances corresponding to the plurality of candidate routes. The processor may rank the plurality of candidate routes based at least in part on the distances to determine a first ranking result. The processor may determine the recommended route based on the first ranking result.

In some embodiments, the processor may identify a first distance of the plurality of distances based on the first ranking result. The processor may select, from the plurality of candidate routes, a first candidate route associated with the first distance as the recommended route.

In some embodiments, the processor may determine a plurality of traffic conditions corresponding to the plurality of candidate routes. The processor may rank the plurality of candidate routes based at least in part on the traffic conditions to determine a second ranking result. The processor may determine the recommended route based on the second ranking result.

In some embodiments, the processor may identify a first traffic condition of the plurality of traffic conditions based on the second ranking result. The processor may select, from the plurality of candidate routes, a second candidate route associated with the second traffic condition as the recommended route.

In some embodiments, the processor may receive the service request from a requestor terminal. The processor may send the data related to the reference direction to the requestor terminal.

According to a third aspect of the present disclosure, a non-transitory computer readable medium is provided. The non-transitory computer readable medium may include executable instructions. When at least one processor executes the instructions, the at least one processor may be caused to effectuate a method. The method may include one or more of the following operations. The at least one processor may determine a start location and a destination related to the service request. The at least one processor may determine a recommended route based on the start location and the destination. The at least one processor may determine a reference direction related to a vehicle based on the recommended route. The at least one processor may send data related to the reference direction to at least one provider terminal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to processing a service request, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The term "passenger," "requestor," "service requestor," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service request" and "order" in the present disclosure are used interchangeably to refer to request that may be initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable, or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure provides online systems and methods for determining reference information (e.g., a reference direction related to a vehicle) associated with a service request for an on-demand service. The systems and methods may determine a recommended route related to the service request and determine the reference information based on the recommended route. The systems and methods may further send the reference information to at least one provider terminal.

It should be noted that online on-demand transportation services, such as online taxi hailing, is a new form of service rooted only in post-Internet era. It provides technical solutions to users and service providers that could raise only in post-Internet era. In pre-Internet era, when a user calls for a taxi on street, the taxi request and acceptance occur only between the passenger and one taxi driver that sees the passenger. If the passenger calls a taxi through telephone call, the service request and acceptance may occur only between the passenger and one service provider (e.g., one taxi company or agent). Online taxi hailing, however, allows a user of the service to real-time and automatic distribute a service request to a vast number of individual service providers (e.g., taxi) distance away from the user. It also allows a plurality of service provides to respond to the service request simultaneously and in real-time. Meanwhile, in modern societies, taxi service has become an industry of huge scale. Millions of passengers take taxis every day via online taxi hailing platforms. Only through the help of Internet can studying behaviors of the passengers' taxiing behavior becomes possible. Accordingly, prediction of taxi hailing through a passenger's online taxi hailing activity, is also a new form of service rooted only in post Internet era.

Figure 1:
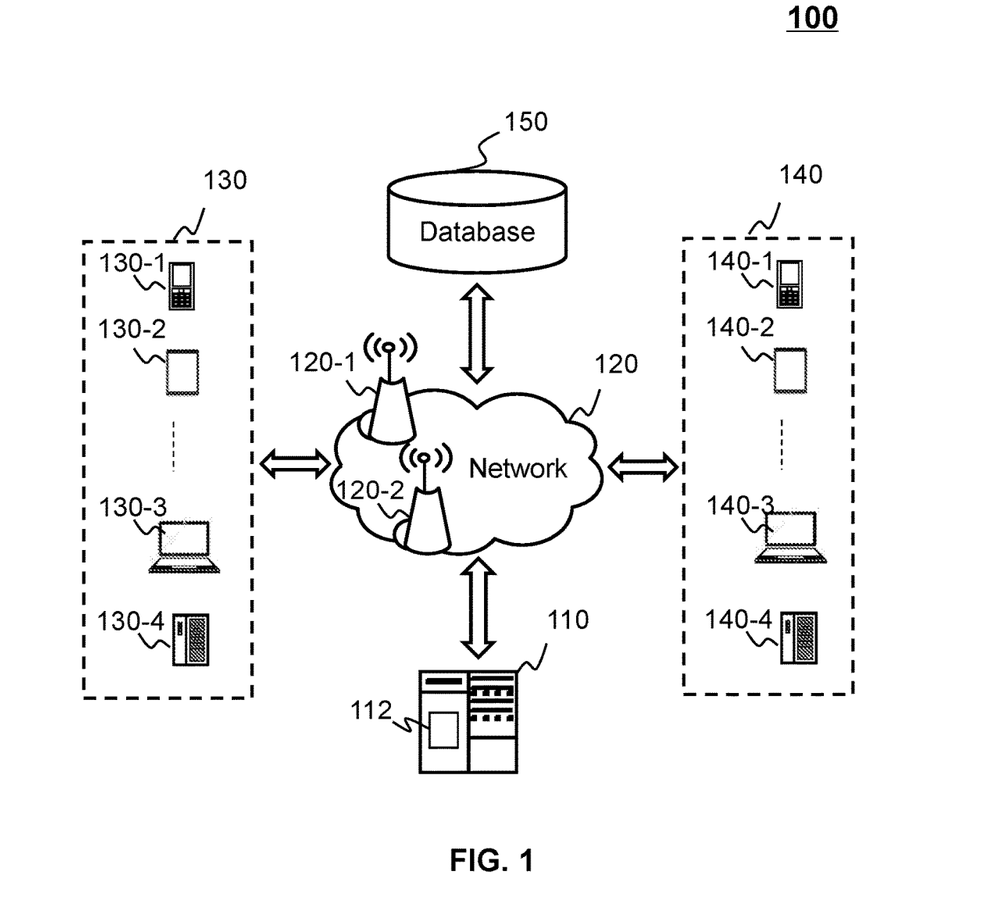
FIG. 1 is a schematic diagram illustrating an exemplary on-demand service system according to some embodiments of the present disclosure.

FIG. 1 is a schematic diagram of an exemplary on-demand service system 100 according to some embodiments of the present disclosure. For example, the on-demand service system 100 may be an online transportation service platform for transportation services such as taxi hailing, chauffeur services, delivery vehicles, carpool, bus service, driver hiring, and shuttle services. The on-demand service system 100 may be an online platform including a server 110, a network 120, a requestor terminal 130, a provider terminal 140, and a database 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the database 150 via the network 120. As another example, the server 110 may be directly connected to the requestor terminal 130, the provider terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine a reference direction related to a vehicle based on a recommended route and send the reference direction to at least one provider terminal 140. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the requestor terminal 130, the provider terminal 140, and the database 150) may send information and/or data to other component(s) in the on-demand service system 100 via the network 120. For example, the server 110 may obtain/acquire service request from the requestor terminal 130 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, the provider terminal 140 may be a device with positioning technology for locating the position of the provider and/or the provider terminal 140. In some embodiments, the requestor terminal 130 and/or the provider terminal 140 may communicate with other positioning device to determine the position of the requestor, the requestor terminal 130, the provider, and/or the provider terminal 140. In some embodiments, the requestor terminal 130 and/or the provider terminal 140 may send positioning information to the server 110.

The database 150 may store data and/or instructions. In some embodiments, the database 150 may store data obtained from the requestor terminal 130 and/or the provider terminal 140. In some embodiments, the database 150 may store data and/or instructions that the server 110 may execute or use to perform exemplary methods described in the present disclosure. In some embodiments, the database 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the on-demand service system 100 (e.g., the server 110, the requestor terminal 130, the provider terminal 140, etc.). One or more components in the on-demand service system 100 may access the data or instructions stored in the database 150 via the network 120. In some embodiments, the database 150 may be directly connected to or communicate with one or more components in the on-demand service system 100 (e.g., the server 110, the requestor terminal 130, the provider terminal 140, etc.). In some embodiments, the database 150 may be part of the server 110.

In some embodiments, one or more components in the on-demand service system 100 (e.g., the server 110, the requestor terminal 130, the provider terminal 140, etc.) may have a permission to access the database 150. In some embodiments, one or more components in the on-demand service system 100 may read and/or modify information relating to the requestor, provider, and/or the public when one or more conditions are met. For example, the server 110 may read and/or modify one or more users' information after a service. As another example, the provider terminal 140 may access information relating to the requestor when receiving a service request from the requestor terminal 130, but the provider terminal 140 may not modify the relevant information of the requestor.

In some embodiments, information exchanging of one or more components in the on-demand service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

In some embodiments, each of terminals 130 and/or 140 can store map data related to one or more regions (e.g., a city, one or more portions of a city, a district, a state, a country, etc.). In some embodiments, the terminals 130 and/or 140 can access the map data online and/or offline to implement one or more embodiments in accordance with the present disclosure. In some embodiments, the terminals 130 and/or 140 can request for map data from one or more servers.

Figure 2:
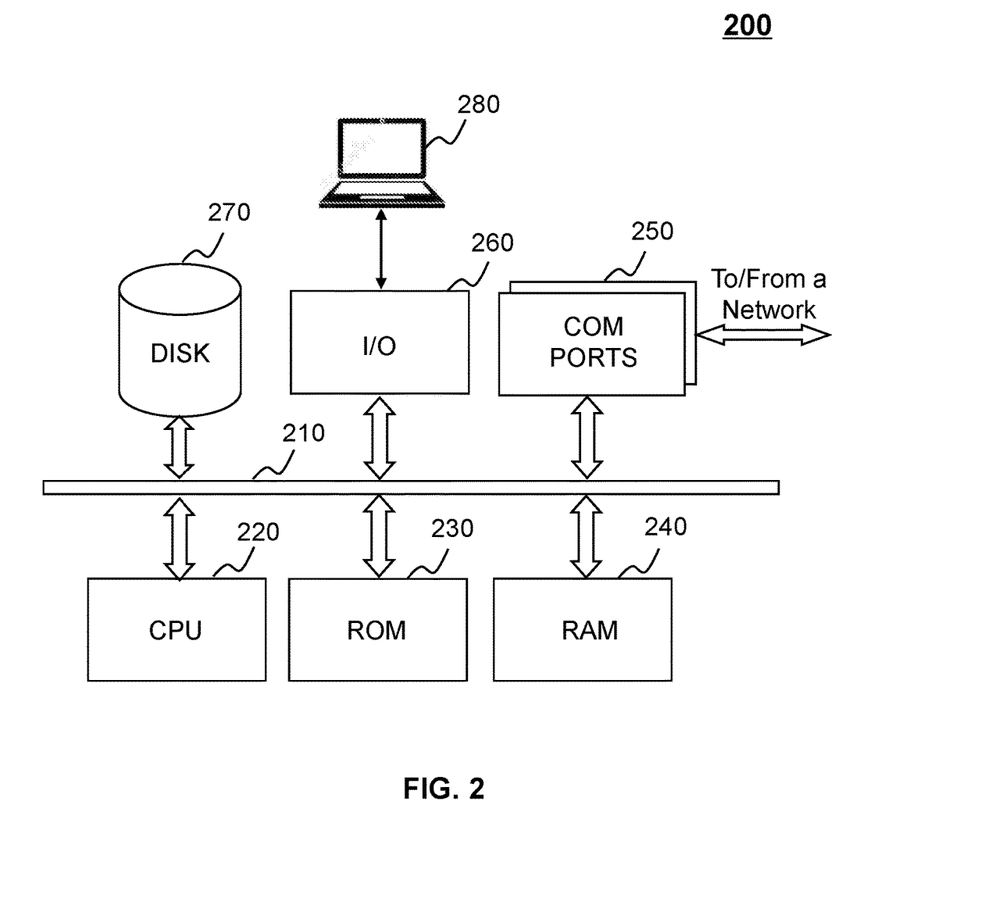
FIG. 2 is a schematic diagram illustrating an exemplary computing device in the on-demand service system according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one CPU and/or processor is illustrated in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
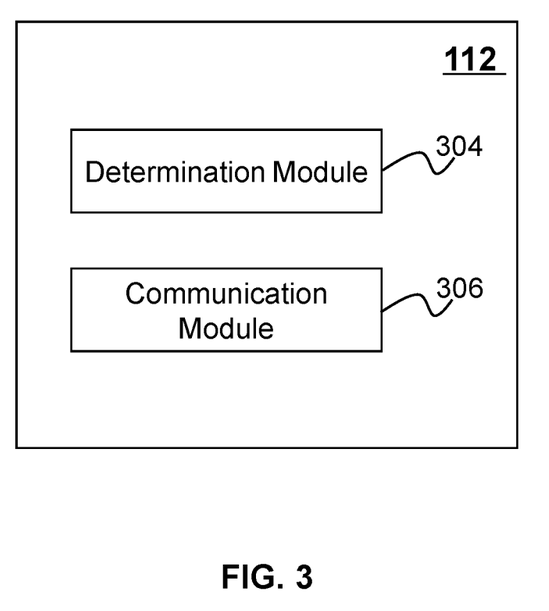
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include a determination module 304 and a communication module 306.

The determination module 304 may be configured to determine reference information associated with a service request. The determination module 304 may receive the service request from a requestor terminal 130 via the network 120. The determination module 304 may further analyze the service request and determine first information (e.g., a start location, a destination, a start time, etc.) related to the service request.

The determination module 304 may determine reference information based on the first information related to the service request. For example, the determination module 304 may determine a recommended route based on the start location and/or the destination. As another example, the determination module 304 may determine a reference direction related to a vehicle based on the recommended route. As used herein, reference direction related to a vehicle may refer to the heading of the vehicle (e.g., a direction the vehicle is pointing). The reference direction may or may not be the same as a direction in which the vehicle moves. The reference direction may be used as a reference for a service provider to park the vehicle. For example, the service provider can park the vehicle in the reference direction (e.g., by parking the vehicle so that the vehicle points in the reference direction). In some embodiments, the reference direction related to the vehicle may be and/or include a start direction of the recommended route (e.g., a direction in which the vehicle is pointing when the vehicle starts at the start direction).

Figure 5:
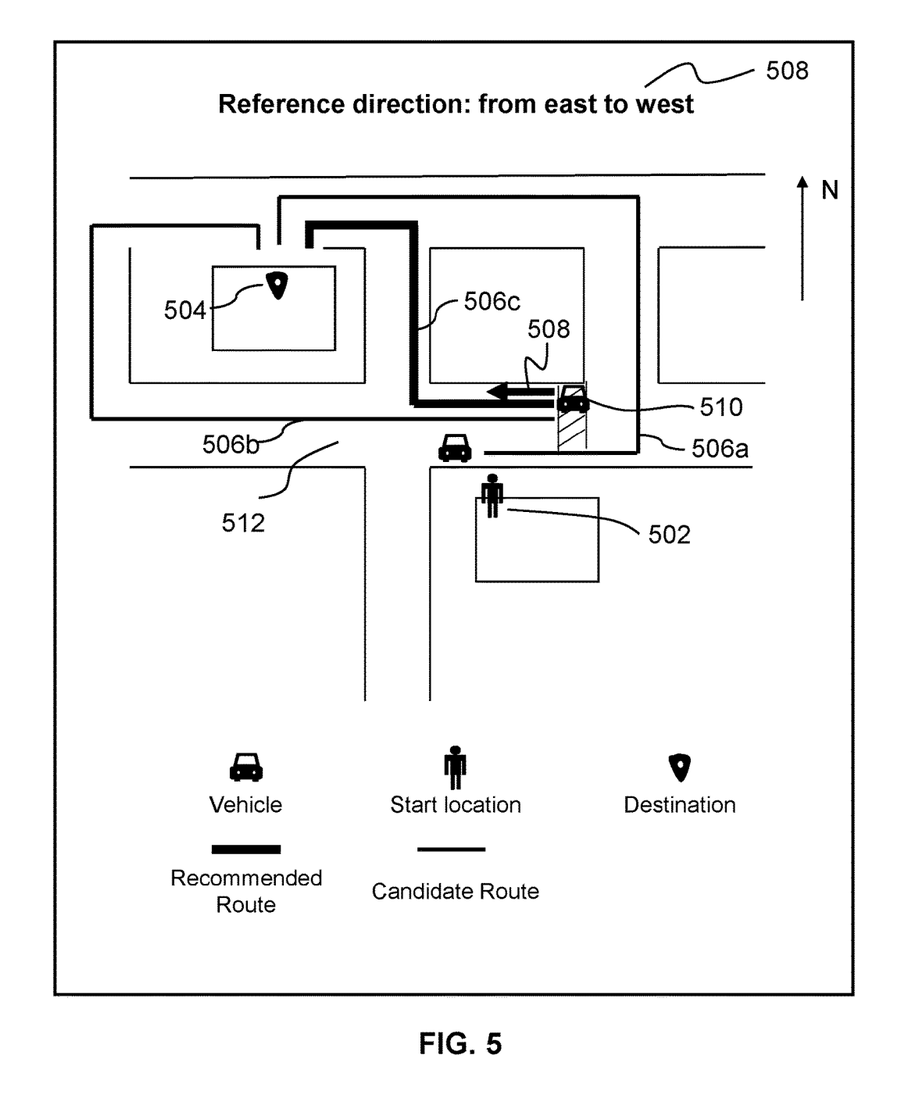
FIG. 5 is a schematic diagram illustrating an exemplary user interface for presenting reference information associated with a service request according to some embodiments of the present disclosure.

The communication module 306 may be configured to send the reference information associated with the service request (e.g., the reference direction related to a vehicle) and/or any data associated with the service request to at least one provider terminal 140. The reference information may be displayed on the at least one provider terminal 140. The provider terminal 140 may display the reference information using any suitable content, such as text, image, video content, audio content, graphics, etc. In some embodiments, the reference information may be displayed by displaying one or more user interfaces (e.g., a user interface 500 as illustrated in FIG. 5). In some embodiments, the communication module 306 may further send the reference information associated with the service request (e.g., the reference direction related to a vehicle) to the requestor terminal 130.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the processing engine 112 may include a storage module (not shown in FIG. 3) which may be configured to store the service request and/or the reference information.

Figure 4:
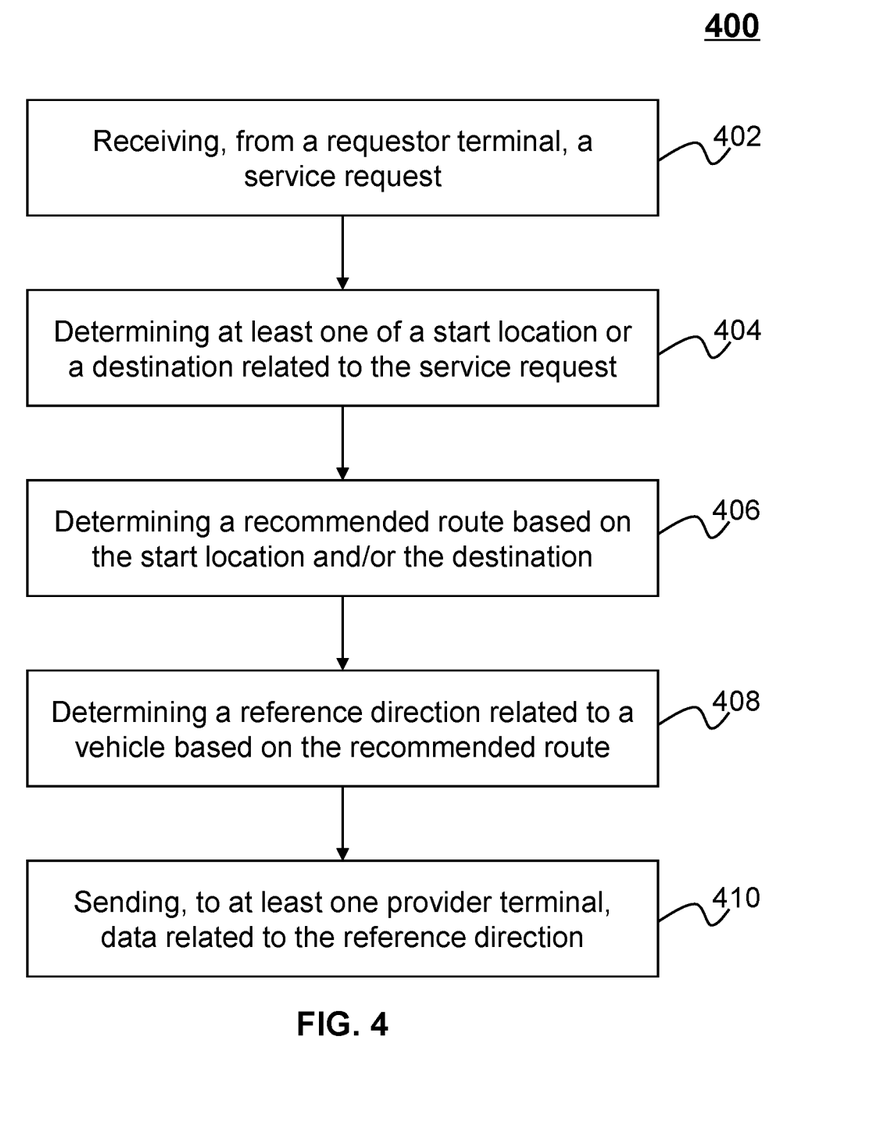
FIG. 4 is a flowchart illustrating an exemplary process/method for sending a reference direction related to a vehicle to at least one provider terminal according to some embodiments of the present disclosure.

FIG. 4 is a flowchart illustrating an exemplary process/method 400 for sending a reference direction to at least one provider terminal 140 according to some embodiments of the present disclosure. The process and/or method 400 may be executed by the on-demand service system 100. For example, the process and/or method 400 may be implemented as a set of instructions (e.g., an application) stored in the storage ROM 230 or RAM 240. The CPU 210 may execute the set of instructions and may accordingly be directed to perform the process and/or method 400. The operations of the illustrated process/method presented below are intended to be illustrative. In some embodiments, the process/method may be accomplished with one or more additional operations not described, and/or without one or more of the operations discussed. Additionally, the order in which the operations of the process/method as illustrated in FIG. 4 and described below is not intended to be limiting.

In step 402, the processing engine 112 may receive a service request from a requestor terminal 130. The service request may be a request for a transportation service (e.g., a taxi service). The service request may be and/or include a real-time request, an appointment request, and/or any other request for one or more types of services. As used herein, the real-time request may indicate that the requestor wishes to use a transportation service at the present moment or at a defined time reasonably close to the present moment for an ordinary person in the art. For example, a request may be a real-time request if the defined time is shorter than a threshold value, such as 1 minute, 5 minutes, 10 minutes, 20 minutes, etc. The appointment request may indicate that the requestor wishes to schedule a transportation service in advance (e.g., at a defined time which is reasonably far from the present moment for the ordinary person in the art). For example, a request may be an appointment request if the defined time is longer than a threshold value, such as 20 minutes, 2 hours, 1 day, etc. In some embodiments, the processing engine 112 may define the real-time request or the appointment request based on a time threshold. The time threshold may be default settings of the on-demand service system 100, or may be adjustable in different situations. For example, in a traffic peak period, the time threshold may be relatively small (e.g., 10 minutes). In an idle period (e.g., 10:00-12:00 am), the time threshold may be relatively large (e.g., 1 hour).

In step 404, the processing engine 112 may determine at least one of a start location or a destination related to the service request. As used herein, the start location may refer to a location where a service provider can pick up the requestor. The destination may refer to a location where the service provider can drop off the requestor. For a real-time request, the start location may be a current location of the requestor. For an appointment request, the start location may be a location defined by the requestor. In some embodiments, the processing engine 112 may extract the start location by a Global Position System (GPS) in the requestor terminal 130. In some embodiments, the requestor may input the start location and the destination via the requestor terminal 130. The processing engine 112 may then retrieve the start location and the destination from the service request.

In some embodiments, the start location or the destination may be an area with a relatively vague description (e.g., Midtown New York) or a specific location (e.g., a particular entrance of a particular subway station). In some embodiments, the start location or the destination may or may not be a location where a vehicle can be parked.

In step 406, the processing engine 112 may determine a recommended route based on the start location and/or the destination. The recommended route may include a recommended start location. In some embodiments, the recommended start location may be the same as the start location of the service request. In some embodiments, the recommended start location may be different from the start location of the service request. For example, the recommended start location may be located at an opposite side of a road with the start location of the service request.

In some embodiments, the processing engine 112 may determine one or more candidate routes based on the start location and/or the destination. The processing engine 112 may determine the recommended route based on the candidate routes.

In some embodiments, the processing engine 112 may determine one or more distances corresponding to the candidate routes. As used to herein, "distance" may refer to a spatial distance between two locations. For example, "distance" may be a distance of a path along which a service provider can drive a vehicle, such as a portion of road or a street. The processing engine 112 may rank the plurality of candidate routes based at least in part on the plurality of distances and determine a first ranking result. The first ranking result may include any information about rankings of candidate routes by distance (e.g., a candidate route associated with the shortest distance, a candidate route associated with the second shortest distances, a candidate route associated with the longest shortest, etc.). The processing engine 112 may determine the recommended route based on the first ranking result. For example, the processing engine 112 may identify a first distance (e.g., the shortest one, the second shortest one, etc.) of the distances based on the first ranking result. The processing engine 112 may select, from the plurality of candidate routes, a first candidate route associated with the first distance (e.g., the candidate route associated with the shortest distance, etc.) as the recommended route.

In some embodiments, the processing engine 112 may determine one or more traffic conditions corresponding to the candidate routes. As used herein, "traffic condition" may refer to a congestion level indicative of a degree of traffic congestion. The congestion level may be determined, for example, based on real-time traffic flows. The congestion level may be represented using one or more characters, numbers, letters, symbols, strings, etc. For example, the congestion level may include "heavy congestion," "normal congestion," "mild congestion," "smooth traffic," "level 1," "level 2," "level a," and/or any other level that can indicate a degree of traffic congestion. In some embodiments, as illustrated in Table 1, the processing engine 112 may define different values and/or features for the plurality of congestion levels.

TABLE 1 a table illustrating exemplary congestion levels

| Congestion level | Traffic flow | Value | Feature |
|---|---|---|---|
| heavy congestion | F < a | 4 | dark red |
| normal congestion | a < F < b | 3 | red |
| mild congestion | b < F < c | 2 | yellow |
| smooth traffic | F > c | 1 | green |

In some embodiments, for each of the candidate routes, the processing engine 112 may determine a global congestion level according to formula (1) below:

$$G = \frac{1*d_1 + 2*d_2 + 3*d_3 + 4*d_4}{D} \quad (1)$$

where G may refer to the value of the global congestion level; $d_1$ may refer to a first distance of a first portion of the candidate route of which the value of the congestion level is 1; $d_2$ may refer to a second distance of a second portion of the candidate route of which the value of the congestion level is 2; $d_3$ may refer to a third distance of a third portion of the candidate route of which the value of the congestion level is 3; $d_4$ may refer to a fourth distance of a fourth portion of the candidate route of which the value of the congestion level is 4; and D may refer to the distance of the candidate route (e.g., the total distance of the candidate route).

The processing engine 112 may rank the plurality of candidate routes based at least in part on the traffic conditions (e.g., the global congestion levels) and determine a second ranking result. The second ranking result can include any information related to rankings of the candidate routes by traffic condition (e.g., a candidate route associated with the minimum congestion, a candidate route associated with the second minimum congestion, etc.). The processing engine 112 may determine the recommended route based on the second ranking result. For example, the processing engine 112 may identify a first traffic condition (e.g., a traffic condition corresponding to the minimum global congestion level, the second minimum global congestion level, etc.) based on the second ranking result. The processing engine 112 may select, from the candidate routes, a second candidate route associated with the first traffic condition as the recommended route.

In some embodiments, the processing engine 112 may rank the candidate routes based on the distances and traffic conditions. For example, the processing engine 112 may assign different weighting coefficients to the "distance" and to the "traffic condition" (e.g., assigning 0.4 to the "distance" and 0.6 to the "traffic condition"). The processing engine 112 may determine one or more combinations of the distance and the traffic condition based on the weighting coefficients. The processing engine 112 may rank the candidate routes based on the combinations and determine a third ranking result. The third ranking result may include any information about rankings of the candidate routes by distance and traffic condition. The processing engine 112 may determine the recommended route based on the third ranking result. For example, the processing engine 112 may identify a first combination (e.g., the minimum one) based on the third ranking result. The processing engine 112 may select, from the candidate routes, a third candidate route associated with the first combination as the recommended route.

It should be noted that the above description of determining the recommended route is provided for the purpose of illustration, and not intended to limit the scope of the present disclosure. For persons having ordinary skills in the art, multiple variations and modifications may be made under the teachings of the present disclosure. For example, the processing engine 112 may select a candidate route as the recommended route based on an instruction from the requestor terminal 130. The processing engine 112 may send the plurality of candidate routes to the requestor terminal 130 via the network 120. The requestor may select a candidate route from the plurality of candidate routes as the recommended route via the requestor terminal 130. The requestor may determine the recommended route based on convenience or his/her personal preferences.

In step 408, the processing engine 112 may determine a reference direction related to a vehicle based on the recommended route. The reference direction related to a vehicle may be used as a reference for a service provider to park the vehicle. In some embodiments, the processing engine 112 may determine the reference direction based on a start direction of the recommended route (e.g., a direction in which the vehicle is pointing when the vehicle starts moving from the start location). For example, the reference direction may be the same as the start direction of the recommended route.

In step 410, the processing engine 112 may send data related to the reference direction to at least one provider terminal 140 via the network 120. The at least one provider terminal 140 may correspond to at least one service provider. The processing engine 112 may send the data related to the reference direction to the at least one provider terminal 140 in a form of text, pictures, audio, video, etc. In some embodiments, the data related to the reference direction may be displayed on the at least one provider terminal 140 (e.g., by presenting a user interface as described in connection with FIG. 5). In some embodiments, the processing engine 112 may also send the data related to the reference direction to the requestor terminal 130.

In some embodiments, before determining the reference direction, the service request has been accepted by a service provider (also referred to as a "target service provider"). The processing engine 112 may send the date related to the reference direction to the target service provider who may refer to the data to pick up the requestor efficiently.

In some embodiments, after receiving the service request from the requestor terminal 130, the processing engine 112 may determine the reference direction related to the service request. The processing engine 112 may then send both the service request and the data related to the reference direction to at least one provider terminal 140. Further, the processing engine 112 may receive a response from the at least one provider terminal 140. The response may include a message indicative of acceptance of the service request by a service provider (e.g., the target service provider).

It should be noted that the above description is provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more of the steps (e.g., step 406, step 408, etc.) of the method/process 400 may be executed by the provider terminal 140.

FIG. 5 is a schematic diagram illustrating an exemplary user interface 500 for displaying data related to reference direction according to some embodiments of the present disclosure. The user interface 500 may be presented by a terminal (e.g., the requestor terminal 130, the provider terminal 140, etc.). The user interface 500 may include one or more user interface elements (also referred to as the "UI elements") for presenting information related to the data related to the reference direction (e.g., the start location, the destination, the recommended route, etc.). Each of the UI elements may be and/or include, for example, one or more buttons, icons, checkboxes, message boxes, text fields, data fields, search fields, etc.

For example, as illustrated in FIG. 5, the user interface 500 may include three lines 506a, 506b and 506c for presenting three candidate routes between a start location 502 and a destination 504 of a service request. The lengths of the lines 506a, 506b, and 506c may correspond to the distances of the three candidate routes, respectively. As illustrated, the length of the line 506c is shorter than the length of the line 506a and the length of the line 506b. As such, the candidate route corresponding to line 506c was selected as the recommended route. The user interface 500 may also include one or more UI elements 510 for presenting a recommended start location of the recommended route. As illustrated, the recommended start location of the recommended route is on the opposite side of a road 512 with the start location 502 of the service request. The user interface 500 may also include one or more UI elements 508 for presenting a reference direction related to a vehicle. The reference direction related to a vehicle may be a start direction of the recommended route. The UI elements 508 may include text (e.g., "reference direction: from east to west"), graphics (e.g., an arrow), images, and/or any other content for presenting the reference direction.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system configured to be implemented in an online transportation service platform, comprising:
   at least one storage medium including a set of instructions for processing at least one service request of a transportation service; and
   logic circuits connected to the at least one storage medium, wherein during operation, the logic circuits load the set of instructions and:
      obtain a service request of a transportation service sent to the system through a network;
      determine a start location and a destination related to the service request;
      determine a plurality of candidate routes based on the start location and the destination;
      determine a recommended route based on the plurality of candidate routes;
      determine a reference direction related to a vehicle based on the recommended route; and
      send, to at least one provider terminal, data related to the reference direction.

2. The system of claim 1, wherein to determine the reference direction related to the vehicle based on the recommended route, the logic circuits further:
   determine a start direction of he recommended route; and
   determine the reference direction related to the vehicle based on the start direction of the recommended route.

3. The system of claim 1, wherein to determine the recommended route based on the plurality of candidate routes, the logic circuits further:
   determine a plurality of distances corresponding to the plurality of candidate routes;
   rank the plurality of candidate routes based at least in part on the distances to determine a first ranking result; and
   determine the recommended route based on the first ranking result.

4. The system of claim 3, wherein to determine the recommended route based on the first ranking result, the logic circuits further:
   identify a first distance of the plurality of distances based on the first ranking result; and
   select, from the plurality of candidate routes, a first candidate route associated with the first distance as the recommended route.

5. The system of claim 1, wherein to determine the recommended route based on the plurality of candidate routes, the logic circuits further:
   determine a plurality of traffic conditions corresponding to the plurality of candidate routes;
   rank the plurality of candidate routes based at least in part on the traffic conditions to determine a second ranking result; and
   determine the recommended route based on the second ranking result.

6. The system of claim 5, wherein to determine the recommended route based on the second ranking result, the logic circuits further:
   identify a first traffic condition of the plurality of traffic conditions based on the second ranking result; and
   select, from the plurality of candidate routes, a second candidate route associated with the first traffic condition as the recommended route.

7. The system of claim 1, wherein the logic circuits further:
   receive, from a requestor terminal, the service request; and
   send, to the requestor terminal, the data related to the reference direction.

8. The system of claim 1, wherein the data related to the reference direction comprises data for presentation of the reference direction related to the vehicle.

9. A method, comprising:
   obtaining, by a processor, a service request of a transportation service through a network,
   determining, by the processor, a start location and a destination related to the service request;
   determining, by the processor, a plurality of candidate routes based on the start location and the destination;
   determining, by the processor, a recommended route based on the plurality of candidate routes;
   determining, by the processor, a reference direction related to a vehicle based on the recommended route; and
   sending, to at least one provider terminal, data related to the reference direction.

10. The method of claim 9, wherein determining the reference direction related to the vehicle based on the recommended route further comprises:
    determining a start direction of the recommended route; and
    determining the reference direction related to the vehicle based on the start direction of the recommended route.

11. The method of claim 9, wherein determining the recommended route based on the plurality of candidate routes further comprises:
    determining a plurality of distances corresponding to the plurality of candidate routes;
    ranking the plurality of candidate routes based at least in part on the distances to determine a first ranking result; and
    determining the recommended route based on the first ranking result.

12. The method of claim 11, wherein determining the recommended route based on the first ranking result further comprises:
    identifying a first distance of the plurality of distances based on the first ranking result; and
    selecting, from the plurality of candidate routes, a first candidate route associated with the first distance as the recommended route.

13. The method of claim 9, wherein determining the recommended route based on the plurality of candidate routes further comprises:
    determining a plurality of traffic conditions corresponding to the plurality of candidate routes;
    ranking the plurality of candidate routes based at least in part on the traffic conditions to determine a second ranking result; and
    determining the recommended route based on the second ranking result.

14. The method of claim 13, wherein determining the recommended route based on the second ranking result further comprises:
    identifying a first traffic condition of the plurality of traffic conditions based on the second ranking result; and
    selecting, from the plurality of candidate routes, a second candidate route associated with the first traffic condition as the recommended route.

15. The method of claim 9, further comprising:
receiving, from a requestor terminal, the service request; and
sending, to the requestor terminal, the data related to the reference direction.

16. The method of claim 9, wherein the data related to the reference direction comprises data for presentation of the reference direction related to the vehicle.

17. A non-transitory computer-readable medium including executable instructions that, when executed by at least one processor, cause the at least one processor to effectuate a method comprising:
   obtaining a service request of a transportation service through a network;
   determining a start location and a destination related to the service request;
   determining a plurality of candidate routes based on the start location and the destination;
   determining a recommended route based on the plurality of candidate routes;
   determining a reference direction related to a vehicle based on the recommended route; and
   sending, to at least one provider terminal, data related to the reference direction.

18. The non-transitory computer-readable medium of claim 17, the method further comprising:
   determining a start direction of the recommended route; and
   determining the reference direction related to the vehicle based on the start direction of the recommended route.

* * * * *